No. 609,733. Patented Aug. 23, 1898.
J. L. COKER, Jr.
DIGESTER AND METHOD OF PROTECTING SAME.
(Application filed June 25, 1897.)
(No Model.)
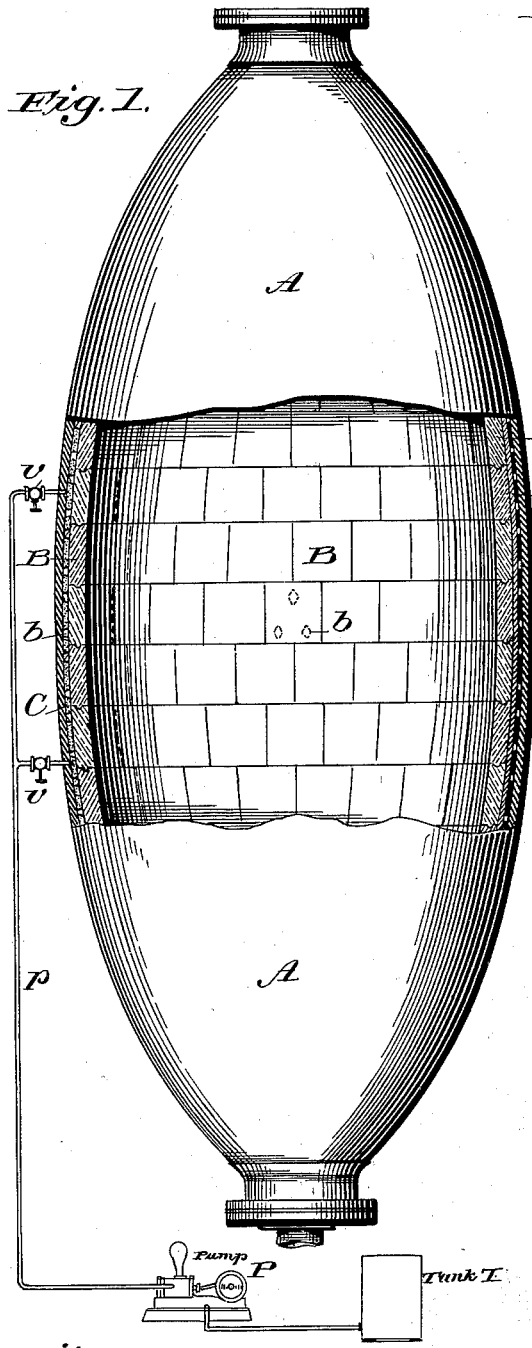
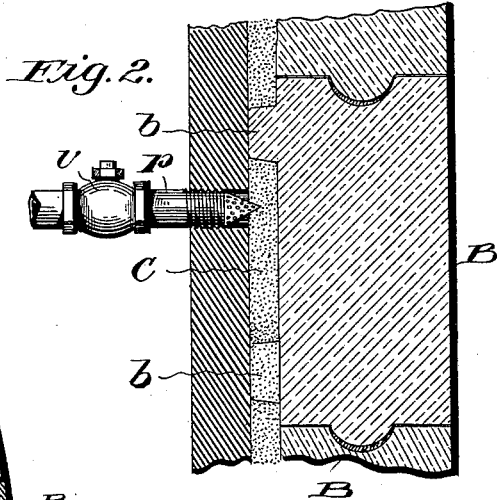
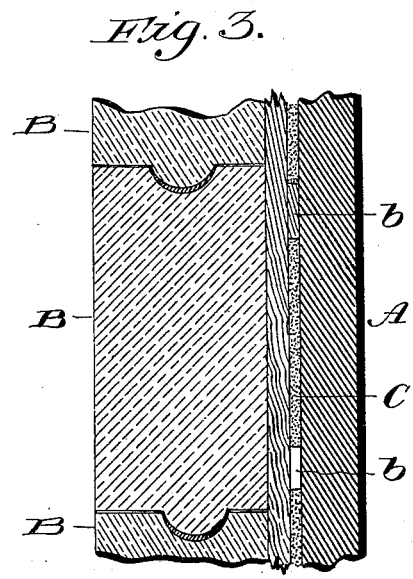
Witnesses:
Inventor:
James Lide Coker, Jr.

UNITED STATES PATENT OFFICE.

JAMES LIDE COKER, JR., OF HARTSVILLE, SOUTH CAROLINA.

DIGESTER AND METHOD OF PROTECTING SAME.

SPECIFICATION forming part of Letters Patent No. 609,733, dated August 23, 1898.

Application filed June 25, 1897. Serial No. 642,317. (No model.)

*To all whom it may concern:*

Be it known that I, JAMES LIDE COKER, Jr., of Hartsville, in the county of Darlington and State of South Carolina, have invented certain new and useful Improvements in Digesters and in the Method of Protecting the Same, of which the following is a specification.

Various methods have heretofore been employed for the purpose of protecting the metal shell of wood-pulp digesters from the corrosive action of the acids used in "cooking" the material.

In some cases the interior of the shell has been lined with lead, and then a brick or tile wall has been built up against the inner face of the lead lining. In other cases the interior of the shell has been plastered with cement (usually Portland cement) and then protected by tiling to shield the cement from erosive action, or like result has been attained by first building up a brick wall within the shell at some distance from the inner wall of the shell, and then ramming cement into the space between the two. None of these methods is altogether reliable, and all of them are expensive.

Various ingredients also have been used to form the pasty or sometimes putty-like mass for plastering or coating the inner surface of the metal shell of the digester, as well as for filling the space in between the shell and the brick lining.

It is the object of my invention to cheapen the first cost of the lining, as well as to provide a simple and efficient means for closing any leaks which are due to imperfect construction of the lining or which may occur from time to time in the lining during the use of the digester.

The method I employ is one which depends upon the employment of a solution containing a salt which in chemical combination with the acid or acids used in the digester will form an insoluble precipitate.

The solution is introduced under pressure into a space left for that purpose between the cement or brick lining and the metal shell. The consequence of this is that the solution from without will find and tend to enter weak spots in the lining, just as the acid from within will find and tend to enter the same spots. The result is that the two solutions, containing the one a salt and the other an acid, meet, and by the reaction thus set up an insoluble precipitate is formed and deposited *in situ*, so to speak, effectively filling up and closing in the lining all the avenues of escape for the acid.

I prefer to fill the interspace between the lining and the shell with a porous absorbent material, such as clean-washed sand, through which the solution can readily percolate. This material furnishes a firm solid backing for the lining, while it also holds a sufficient quantity of the solution to effectually neutralize any acid that may escape through the lining.

My method of procedure is also applicable to the closing of leaks in cement and other linings laid up contiguous to the shell such as is now in use. In such a case the lining can be slightly loosened, if necessary, by any suitable means—as, for example, by hammering upon the exterior of the shell in the neighborhood of the leak—and then after boring a hole in the shell at that point the solution can be introduced through that hole into the space thus created between the shell and the lining. Said solution meets and combines with the leaking acid, forming therewith the insoluble precipitate, by which all cracks and leaky joints are closed and the lining is rendered again water-tight.

In the accompanying drawings, forming part of this specification, and to which I shall now refer for a more complete understanding of my invention, Figure 1 is an elevation, partly in vertical section, of a digester embodying my invention. The figure is mainly diagrammatic and illustrates two styles of lining, either of which may be employed with good results. Fig. 2 is an enlarged sectional view of the style of lining shown on the left hand of Fig. 1. Fig. 3 is a like view of the style of lining shown on the right hand of Fig. 1.

A is the metal shell of the digester.

B is a brick or tile lining.

C is the interspace between the lining and the shell, preferably filled, as shown, with a porous absorbent material—such, for example, as clean-washed sand. The space C in practice I find need be only, say, half an inch wide, although, of course, I am not limited as to dimensions. The space can be provided for readily by means of lugs $b$, which can be formed in one with the bricks or tiles themselves, as shown at the left of Fig. 1 and in Fig. 2, or which when an interlining of planking D is employed, as at the right of Fig. 1 and in Fig. 3, may be attached to the exterior of the planking. The lugs are preferably diamond or lozenge shaped, so as to offer no obstruction to the introduction of the sand filling.

Communicating with the interspace C through the shell of the digester are pipes $p$, one or more in number, leading to a force-pump P, which is in communication with a tank T or other source of supply of a solution containing a salt, which will combine with the acid or acids of the digester to form an insoluble precipitate. I prefer to use for this purpose silicate of soda.

The pipes $p$ are provided with valves $v$ for controlling the flow of liquid, which valves may be either hand-valves, as shown, or automatic check-valves, which will permit the passage of liquid from the pump, but will automatically close to prevent any backflow from the digester, or I may use both hand-valves and automatic check-valves.

The bricks or tiles are preferably of the form shown in cross-section, as thereby I obtain a tight joint with a minimum use of cement; but they may be of any ordinary or suitable shape.

In the digester which I have actually built and tested and which is now in use I have introduced an interlining of matched or tongue-and-grooved planking D, as shown in Fig. 3 and at the right of Fig. 1. This interlining seems to afford an excellent support for the interior brick lining, which in the digester as I have built it consists of ordinary brick laid in cement, and besides prevents the transmission of heat and serves to keep the digester-shell cool during use.

In this connection I remark that it is one of the advantages of my invention that the brick lining can be built up in this cheap and expeditious way of ordinary building-brick and by the ordinary mason. Whatever may be the crudities and imperfections of the wall thus built, by treating that wall, after it is built, in accordance with my invention all imperfect joints are cured, all leaks are stopped, and the wall eventually becomes a tight and perfect lining.

After the lining is built up in the digester and the connections between the force-pump and the interspace C are made I prefer to proceed as follows: I force the solution containing the salt into the interspace C by means of the force-pump, and I continue this operation until the inner wall of the brick lining "sweats," or, in other words, until the solution has permeated and forced its way through any imperfect joints and leaky spots in the brick lining and appears on the inner face of the same. I then discontinue the forcing operation and wash out the interior of the digester with water, so as to remove the solution from the inner face of the brick lining. I then charge the digester with acid and the stock to be treated and proceed with the cooking operation in the usual way.

During the operation the acid will find its way into the same passages through which the solution entered and will there meet the solution, with the salt contained in which it combines to form an insoluble precipitate which is deposited *in situ*. Any excess of acid that may pass beyond the lining and enter the interspace C will there still meet the solution and there will be rendered harmless. Thus the acid, through the use and application of the solution in the manner described, is made an active agent in the establishment and maintenance of the barriers by which it is inclosed and shut in. This I believe to be new with me.

I have found that by allowing the pressure of the solution and the acid to alternately preponderate I can so arrange things that each in turn will enter and permeate the leaky joint, and thus gradually build up a stopper for it.

The internal pressure of the digester is, say, eighty pounds to the square inch. The pressure of the solution can be alternately, say, one hundred and fifty pounds and *nil*. In the former case it will enter the leak against the resistance offered by the acid. In the latter case it will recede before the acid. I can in this way obtain an alternate back-and-forth movement of the salt and the acid through the leak, which will result in stopping it thoroughly.

Thus in course of successive cookings the building up of fillings or stoppers for all leaks proceeds until finally the wall or lining becomes absolutely tight, and after this further treatment of the lining with the solution will not be required except at comparatively rare intervals. In a digester now in use which has been treated according to my invention the lining has stood a continuous use of about six months without requiring further treatment.

I remark, however, that it is well in any event to introduce, or at least to attempt to introduce, the solution under pressure from time to time. If it can be introduced in any material quantity, this indicates that there is a leak in the lining, and the operation is then kept up until the leak is stopped, as above explained. I can thus use the forcing apparatus as a means for ascertaining the condition of the lining at any time.

The space C is preferably of a width to receive the sand or other porous packing; but, if desired, the brick or tile can be laid up reasonably close and, indeed, at points even touching the shell, the roughness and unevenness on the face of the bricks next to the shell preventing a tight fit between the two and leaving between them a space which, while narrow, will still suffice to permit the solution to circulate or percolate between the shell and the lining and to find any leaky points in the latter.

The interspace C, whether wide or narrow, need not contain any sand filling, but can be filled simply with the solution, and it may be continuous, as shown, or divided up into smaller spaces or sections, each having its own communication with the source of supply of the solution.

Having described my invention and the best way now known to me of carrying the same into practical effect, what I claim herein as new, and desire to secure by Letters Patent, is—

1. The method of stopping leaks in brick or cement linings of digesters which consists in introducing under pressure into the digester, between the shell and its lining, a solution containing a salt which will combine with the acid or acids of the digester to form an insoluble precipitate, substantially as and for the purposes hereinbefore set forth.

2. The method of treating digester-linings which consists in introducing into the digester, between its shell and the lining, a solution under pressure containing a salt which will combine with the acid or acids of the digester to form an insoluble precipitate, and varying said pressure during the "cooking" operation so that it shall alternately and at suitable intervals exceed and fall below the internal pressure at which the digester is working, substantially as and for the purposes hereinbefore set forth.

3. The combination of the digester-shell, the lining separated from the shell by an interspace, means for introducing a salt solution under pressure into said interspace, and an absorbent filling in said interspace which backs and supports the lining and holds the solution, substantially as hereinbefore set forth.

In testimony whereof I have hereunto set my hand this 23d day of June, 1897.

JAMES LIDE COKER, JR.

Witnesses:
EWELL A. DICK,
E. HUME TALBERT.